United States Patent [19]

Gray et al.

[11] 4,233,933
[45] Nov. 18, 1980

[54] SPRAY COATING MACHINE

[75] Inventors: Dorian R. Gray, Nashville, Tenn.; Richard N. Bishop, Plymouth; William K. Timmons, Ann Arbor, both of Mich.

[73] Assignee: Ford Motor Company, Dearborn, Mich.

[21] Appl. No.: 41,206

[22] Filed: May 21, 1979

[51] Int. Cl.³ .............................................. B05C 5/00
[52] U.S. Cl. .................................. 118/314; 118/323; 239/186
[58] Field of Search .................. 83/524; 118/321, 323, 118/314, 315, 631; 239/186; 427/424

[56] References Cited

U.S. PATENT DOCUMENTS

| | | | |
|---|---|---|---|
| 1,081,751 | 12/1913 | Keats | 83/524 |
| 2,003,778 | 6/1935 | Willis | 118/323 X |
| 2,728,238 | 12/1955 | Paasche | 118/323 X |
| 2,815,298 | 12/1957 | Heffley | 118/314 X |
| 3,379,377 | 4/1968 | Ripple | 239/186 |
| 3,660,061 | 5/1972 | Donley et al. | 65/32 |
| 3,796,184 | 3/1974 | Hawkins | 118/323 |
| 4,141,231 | 2/1979 | Kudlich | 118/314 X |

Primary Examiner—John P. McIntosh
Attorney, Agent, or Firm—William E. Johnson; Olin B. Johnson

[57] ABSTRACT

This disclosure is directed to a machine for applying a spray coating across the width of a glass ribbon. The glass ribbon is one which generally has recently been manufactured and is carried on a conveyor moving below the machine. In accordance with the preferred teachings of this apparatus, two spray applying devices are used. These devices commence their spraying at opposite edges of the moving ribbon of glass. The devices are moved in a simultaneous manner at the same speed from one edge to the other edge of the glass ribbon whereby the apparatus pass each other at the center line of the moving ribbon. When each of the spray apparatus reach the opposite edge of the moving ribbon of glass, their direction of travel is reversed so that they once again pass one another at the center line of the moving ribbon. The first and second spray apparatus are spaced a slight distance from one another in the direction of movement of the ribbon of glass. The moving spray apparatus are cycled back and forth in the aforedescribed manner continuously as the ribbon of glass is moved thereunder so that a coating is applied to the moving ribbon of glass.

1 Claim, 5 Drawing Figures

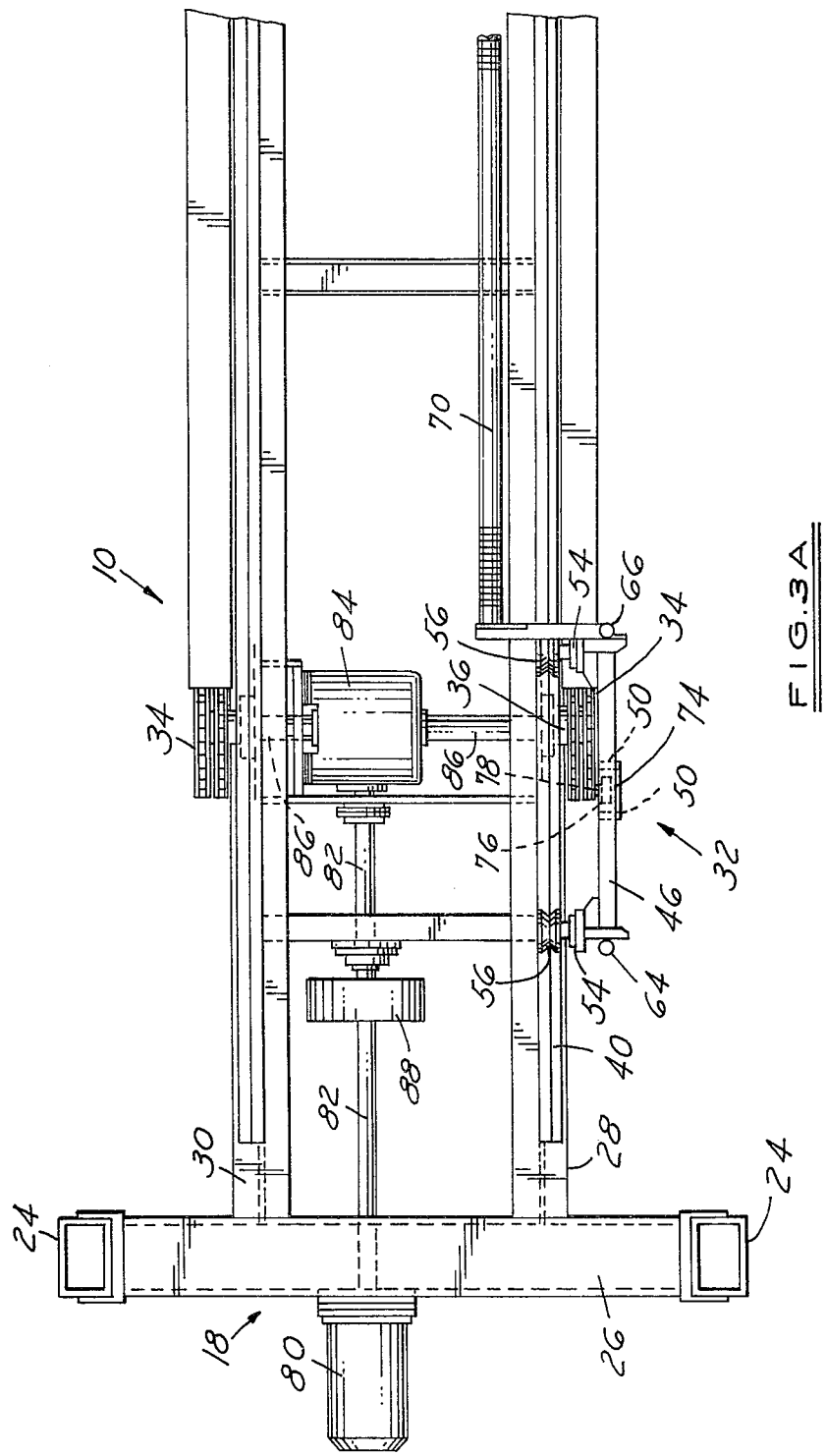

SPRAY COATING MACHINE

BACKGROUND OF THE INVENTION AND PRIOR ART STATEMENT

The prior art has disclosed many devices for applying a coating to a moving ribbon of glass. In particular, the prior art has disclosed many apparatus for applying a metal oxide coating to a moving ribbon of glass, the glass having been manufactured in a float glass furnace. Typical of these showings are the showings of U.S. Pat. Nos. 3,660,061 for a "Coated Glass Sheet and Method of Making the Same"; and 3,796,184 for "Reciprocating Devices Having Vibration Reducing Means."

The two cited patents are typical of the structures known in the art in that they show a single spray zone being moved back and forth across a ribbon of glass to be treated. The single spray zone may have one or more spray heads. However, these cited patents typify the many patents which show the use of a single spray zone being moved alternatively from right to left and from left to right across a ribbon of hot glass in order to apply materials thereto which disintegrate by heat to form a metallic oxide coating on the glass surface.

It is a primary object of this invention to provide a spray coating machine which is more efficient in depositing film than prior known spray coating machines.

SUMMARY OF THE INVENTION

This invention relates to a spray coating machine and, more particularly, to a machine for applying a spray coating across the width of a glass ribbon being carried on a conveyor moving past the machine.

In accordance with the general teachings of the machine of this invention, the machine comprises the following general structure. First support structure is provided which includes a right side support structure located on the right side of the conveyor, and left side support structure located on the left side of the conveyor. A second support structure is provided which includes an upstream support structure and a downstream support structure. The upstream and the downstream support structures have their opposite ends secured to the right side support structure and the left side support structure in a manner that the upstream and the downstream support structures extend across the conveyor in a position spaced above the same.

The upstream support structure and the downstream support structure each have the following structure mounted thereon. A pair of pulleys are mounted on each structure, one of the pulleys being mounted near each end of the structure. An endless chain drive is provided which extends over the pair of pulleys. Guide structure is also formed on the structure to provide a guide track. The guide structure extends along the length of the support structure, generally from one end to the other. A spray gun carrying structure is provided for supporting a spray gun and associated equipment. The spray gun carrying structure is mounted on and movable along the guide structure for movement back and forth along the structure above the glass ribbon on the conveyor. A spray gun and associated equipment for applying a spray of material to the glass ribbon on the conveyor is mounted on the spray gun carrying structure for movement along the guide structure. A pin and slot lost motion connection is provided for interconnecting the spray gun carrying structure and an interconnecting portion of the endless chain drive in a manner that the endless chain drive moves the spray gun carrying structure from one side to the other while said interconnecting portion of the endless chain drive is moving from one of its pulleys to the other, and such that the direction of movement of the spray gun carrying structure is reversed when the interconnecting portion of the endless chain drive moves around the pulley.

A motor is provided for supplying a rotational input. An input shaft interconnects the motor and a gear reduction device. Output shafts interconnect the gear reduction device and the pulleys located at the same end of the upstream and downstream support structure. An energy storage device is connected to the input shaft for storing energy while the endless drive chains are moving their associated spray gun carrying structures between pulleys. This energy storage device then supplys additional input to the gear reduction device and output shafts associated therewith to accelerate the spray gun carrying structures to an operating speed after reversal of direction of movement of the spray gun carrying structure when the interconnected portion of the endless drive chain moves over its associated pulley.

Particular details of the structure of this invention are set forth in the description of the preferred embodiment section of this specification.

BRIEF DESCRIPTION OF THE DRAWINGS

The novel features that are considered characteristic of the invention are set forth with particularity in the appended claim. The invention itself, however, both as to its organization and its method of operation, together with additional objects and advantages thereof, will best be understood from the following description of specific embodiments when read in conjunction with the accompanying drawings, wherein like reference characters indicate like parts throughout the several figures, and in which:

FIGS. 3A and 3B together form, when placed in side-by-side relationship, a plan view of the spray coating machine of this invention.

DESCRIPTION OF THE PREFERRED EMBODIMENT

The spray coating machine is designed to apply a coating material to a glass ribbon in order to develop an adherent coating on the glass which may serve to increase the transmission or reflective characteristics of the glass substrate. Such coating applications and materials are well known to the skilled artisan. In general, the coating material is applied to the glass ribbon as that ribbon emerges from a glass manufacturing process, such as the float process for manufacturing glass. As the glass ribbon emerges from such a manufacturing process, it is still heated to an elevated temperature and it has a newly formed surface upon which the coating materials may be applied. The coating materials are such that the heat within the glass causes the reaction of the materials and the glass surface which produces a desired metallic oxide coating, for example, on the surface of the glass, in order to give the required characteristics to the glass surface.

Figure 1:
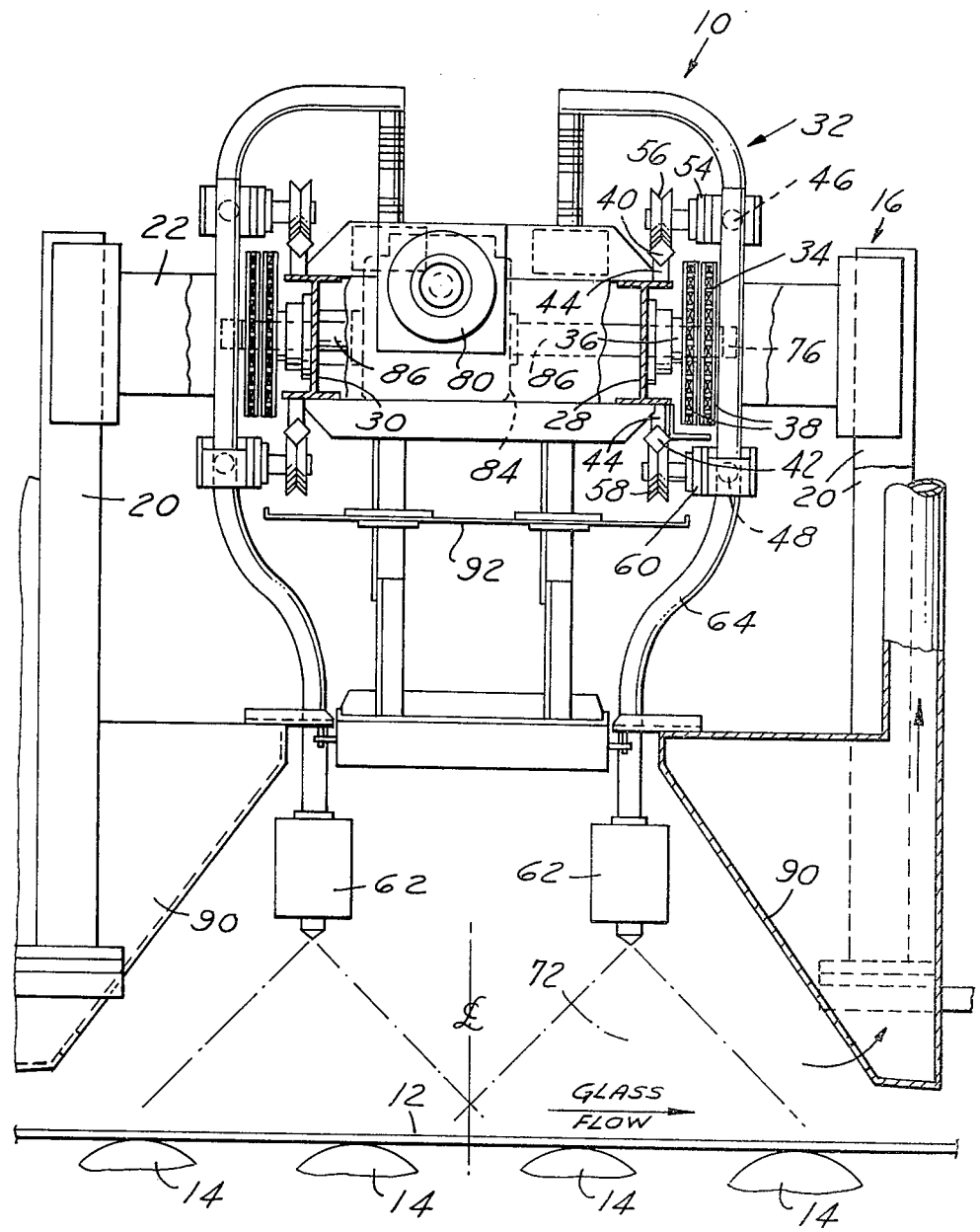
FIG. 1 is an end elevation view, partly in cross section of the spray coating machine of this invention.

In accordance with the teachings of this invention, a spray coating machine, generally designated by the numeral 10, is used to apply a spray coating material to a glass ribbon 12, FIG. 1 only, which is being carried under the spray coating machine on a plurality of conveyor rolls 14—14, FIG. 1 only. In the further description of the spray coating machine of this invention, the movement of glass will be to the right as viewed in FIG. 1, out of the drawings as viewed in the combinations of FIGS. 2A and 2B, and to the bottom of the drawings as viewed in FIGS. 3A and 3B. Right and left hand sides of the conveyor roles 14—14 will be as viewed looking directly at FIGS. 2A and 2B, as well as 3A and 3B. Upstream will mean further along the path of travel of the glass ribbon 12 as it moves along the conveyor roles 14—14.

First support structure includes a right side support structure, generally designated by the numeral 16, and left side support structure, generally designated by the numeral 18. The right side support structure 16 includes a pair of upstanding posts 20—20 mounted on a firm base, not shown. A cross bar post 22 is secured to and extends between the respective upstanding posts 20—20. In a similar manner, the left side support structure 18 also includes a pair of upstanding posts 24—24. These upstanding posts are also secured to a suitable base, not shown. A cross bar post 26 is secured to and extends between the upstanding posts 24—24. A second support structure includes an upstream support structure 28 and a downstream support structure 30. These two support structures have their opposite ends secured to cross bar post 22 on the right hand side support structure 16, and cross bar post 26 on the left side support structure 18. In this manner, the upstream support structure 28 and the downstream support structure 30 are mounted to extend across the conveyor rolls 14—14 in a position spaced above the same so that the glass ribbon 12 moves therebelow.

Both the upstream support structure 28 and the downstream support structure 30 have structures mounted thereon for this purpose of applying a spray material to the glass ribbon 12 moving thereunder on the conveyor rolls 14—14. The structure for accomplishing the spraying which is mounted on the upstream support structure 28 and the downstream support structure 30 is identical. Therefore, only the spraying equipment associated with the upstream support structure 28 will be described herein, as that structure which is mounted on the downstreams support structure 30 is identical in design and construction.

Reference is now made to the upstream support structure 28 which has mounted thereon structure generally indicated by the numeral 32 for applying a spray material to a glass ribbon. This spray applying apparatus includes a pair of pulleys 34—34 mounted from the upstream support structure 28 by suitable rotatable shafts 36—36. An endless drive chain 38 extends over the pair of pulleys 34—34. The pair of pulleys, of course, are mounted near opposite ends of the upstream support structure 28 so that the endless drive chain extends across substantially the entire width of the conveyor rolls 14—14 over which the upstream support structure extends. The right hand pulley 34 is free-wheeling, whereas the left hand pulley 34 is driven in a manner which will be described in a subsequent portion of this specification.

A guide structure is defined by means of an upper guide bar 40 and a lower guide bar 42 held in spaced relationship above and below the upstream support structure 28 by means of spacing elements 44. The upper and lower guide bars are diamond shaped and provide a guide track which extends across the upstream support structure 28 substantially from the right side support structure 16 to the left side support structure 18.

Figure 2A:
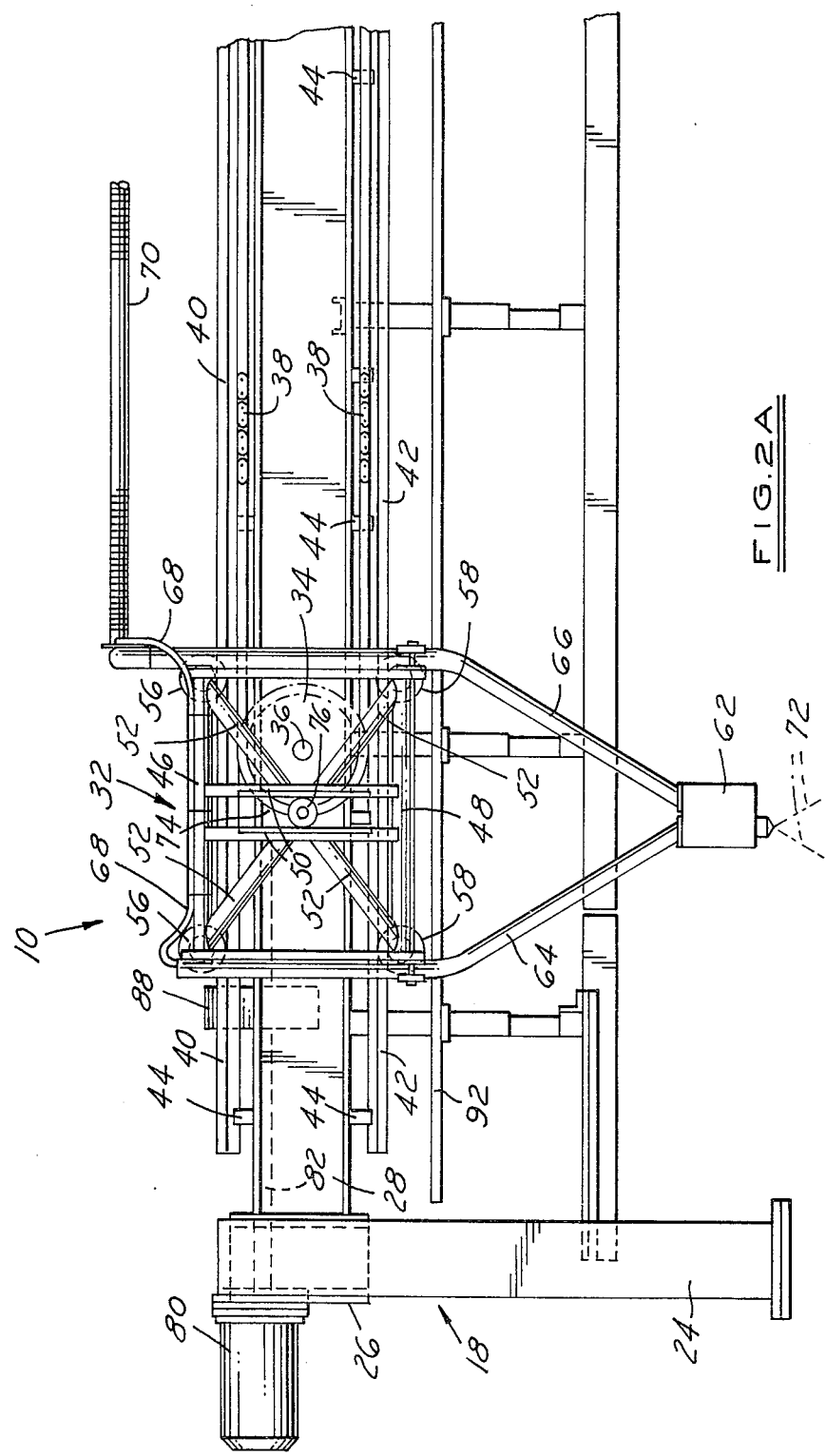
FIGS. 2A and 2B together form a front elevation view of the spray coating machine of this invention.
Figure 3B:
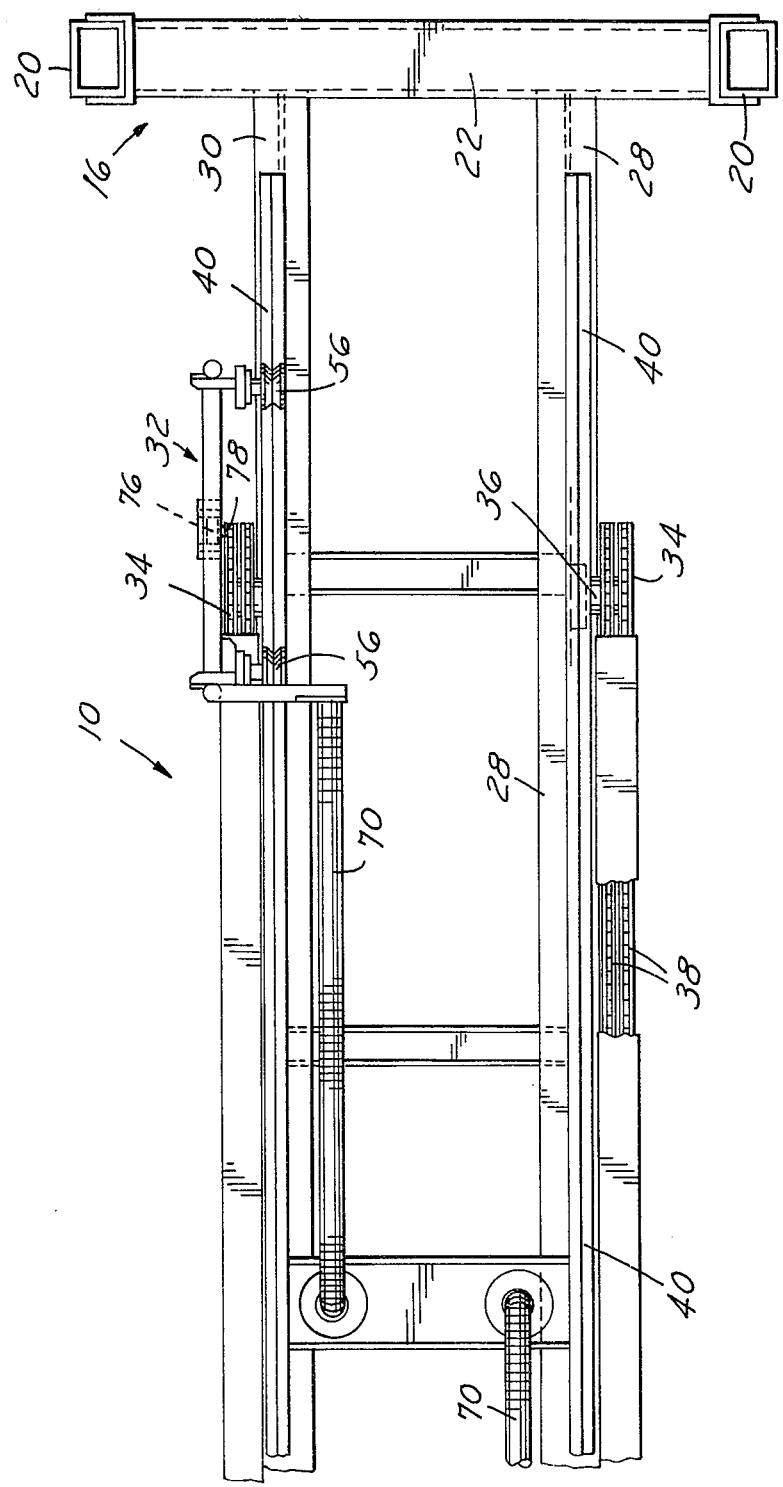

A gun carrying structure is provided for supporting a spray gun and associated equipment. This gun carrying structure is best seen in FIG. 2A. The structure is composed of an upper bar member 46 and a lower bar member 48 interconnected by vertical members 50—50 and braced by cross brace members 52—52. As best seen in FIGS. 1 and 3A, upper bar member 46 supports a pair of shaft structures 54—54, which in turn support thereon rotatable guide wheels 56—56 which are received upon and cooperate with the upper guide bar 40. In a similar fashion, lower guide bar 42 is engaged by rotatable guide wheels 58—58 which are supported by shaft structures 60—60, which in turn are secured to the lower bar member 48. It is in such a manner that the spray gun carrying structure is mounted for movement by its rotatable guide wheels 56—56 and 58—58 for movement back and forth respectively on the upper guide bar 40 and the lower guide bar 42 along the length of the upstream support structure 28 from one side to the other.

Once again, as best seen in FIGS. 1 and 2A, a spray gun 62 is mounted below the spray applying apparatus 32 by means of hollow support members 64 and 66 which respectively are mounted on and extend from the left and right sides of the spray applying apparatus 32. An air line 68, seen only in FIG. 2A, and a spray material conducting line, not shown, pass through flexible tube 70 and then respectively pass through the hollow support member 64 and the hollow support member 66 to meet at the spray gun 62. The spray gun 62 is designed to take the material conveyed through the spray material conducting line and the air line and atomize the same to develop a spray zone 72. Since the spraying of these materials from a spray gun is already well known in the art, no further discussion of this subject matter will be presented herein.

The spray applying apparatus 32 is reciprocated back and forth across the upstream support structure 28 by means of a pin and slot lost motion connection structure which will now be described. A slot 74, best seen in FIG. 2A, for this interconnection is defined between the two vertical members 50—50 of the spray applying apparatus 32. A pin 76 has a rear end portion thereof 78, seen only in FIG. 3A, attached to the endless chain drive 38 at a single location. Thus, a single point or location on the endless drive chain 38 is interconnected by means of the pin 76 and slot 74 arrangement with the spray applying apparatus 32 in order to obtain movement of that spray applying apparatus back and forth across the length of the upstream support structure 28 as the endless drive chain is rotated over its associated pair of pulleys 34—34.

Figure 2B:
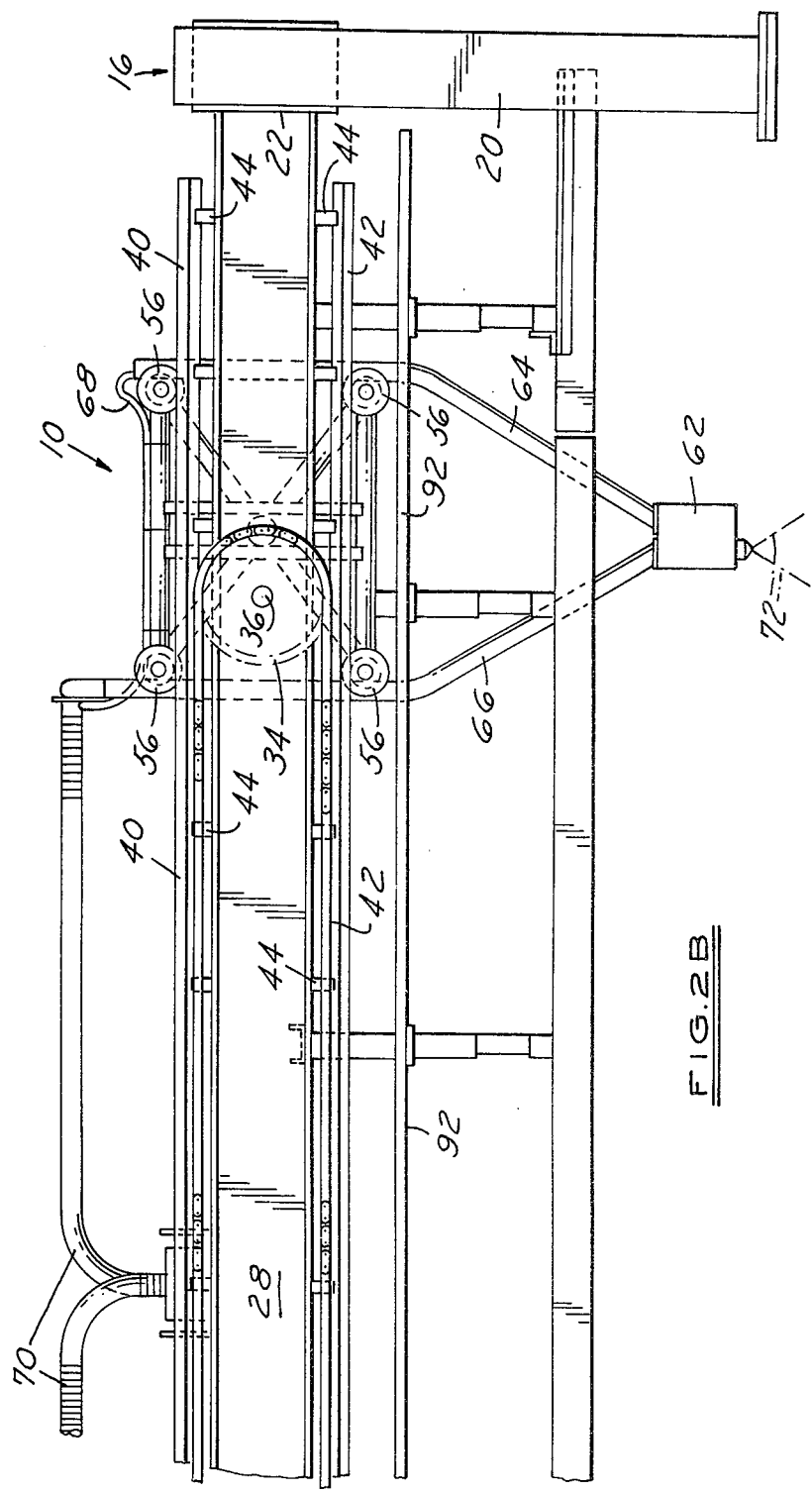

As viewed in FIGS. 2A and 2B, the pin 76 will be at the bottom of the slot 74 as the spray applying apparatus 32 is moved from right to left and at the top of the slot as that same spray apparatus is being from left to right. The pin 76 movement from the bottom of the slot 74 to the top of the slot 74 is accomplished when the endless chain 38 moves about the left hand pulley 34 from the bottom to the top of the pulley. The translation of the pin 76 from the bottom of the slot to the top of the slot occurs in the 180° of rotation about the left hand pulley 34 from the bottom thereof to the top thereof. Once at the top of the slot, the spray applying apparatus 32 is moved to the right, as viewed in FIGS. 2A and 2B.

The spray applying apparatus 32 moves to the right as viewed in FIGS. 2A and 2B until the rear end portion 78 of pin 76 comes in contact with the right hand pulley 34 and moves thereover from the top to the bottom thereof. This action causes the pin 76 to move downwardly in slot 74 and thereby effects a reversal of the direction of movement of the spray applying apparatus 32. Suitable limit switches, not shown, may be associated with the spray applying apparatus 32 that the spray from the spray gun 62 is terminated after the spray applying apparatus 32 has passed over the respective edges of the ribbon of glass 12 moving on the conveyor rolls 14—14 positioned below the spray applying apparatus 32.

A motor 80 is mounted on the cross bar post 26 of the left side support structure 18. This motor 80 provides the necessary rotational input for driving the pulleys 34—34 which carries the endless drive chain 38. This motor 80 is connected by means of an input shaft 82 to a gear reduction device 84. The gear reduction device is mounted between the pulleys 34—34 at the left hand end of the upstream support structure 28 and the downstream support structure 30. The gear reduction drive is connected by means of output shafts 86—86, seen in FIG. 3A, to the rotatable shafts 36 connected to the pulleys 34 which provide the means for driving the endless drive chain 38. A high speed rotational output developed by the motor 80 and applied to the input shaft 82 is taken by the gear reduction drive 84, reduced in rotational speed, and thereafter applied to the output shafts 86, which in turn drive the aforementioned pulleys 34. In this manner, a constant direction rotational input is provided to the pair of pulleys which in turn apply that drive to the endless drive chain 38 to cause reciprocation of the spray applying apparatus 32 in the manner discussed previously.

In accordance with the preferred teachings of the method of this invention, the spray applying apparatus 32—32 located on the upstream support structure 28 and the downsteam support structure 30 are so positioned that the structures on each of the respective support structures pass one another in the center of the support structures going in opposite directions. The two spray applying apparatus 32—32 reach opposite ends of the supporting structures at the same time and are simultaneously reversed in direction so that they once again come toward one another and pass at the center of the support structure before repeating the reversals in direction of movements thereof.

In accordance with the principal teachings of the method of this invention, an energy storage structure, such as a flywheel 88, is mounted on the input shaft 82. The purpose of this flywheel is to obtain a rapid acceleration of the spray applying apparatus 32—32 once their direction of movement has been changed. During the period of time that the spray applying apparatus are moving from one end of the associated support structure to the other, energy is being stored in the flywheel. During the period of time that the reversal in direction of movement of the spray applying apparatus 32 is taking place, more energy is required in the system and that energy is supplied from the flywheel rotative input. This rotative input ensures a rapid reversal and rapid acceleration to full speed of the spray applying apparatus along their associated guide bars. By rapidly accelerating, one ensures that the spray gun 62 is moved at a substantially uniform speed across the glass ribbon 12 from one edge thereof to the other so that the entire width of the glass ribbon is subjected to the same spray conditions and there is no differential in the rate of movement of the gun thereover which would cause a differential in the rate of application of the spray material to the glass surface.

Reference is made to FIG. 1. In this Figure, there are shown some metal exhaust hoods 90—90 used to define the limits of the spray zone. The use of such exhaust hoods is well known in the art. Also shown in the drawings is a metal tray 92, the purpose of which is to keep contaminents out of the system.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A machine for applying a spray coating across the width of a glass ribbon being carried on a conveyor moving past the machine, the machine comprising:

first support structure including right side support structure located on the right side of the conveyor and left side support structure located on the left side of the conveyor;

second support structure including upstream support structure and downstream support structure, said upstream and downstream support structures having their opposite ends secured to said right side support structure and said left side support structure in a manner that said upstream and said downstream support structures extend across the conveyor in a position spaced above the same;

said upstream support structure and said downstream support structure each having the following structure mounted thereon;

a pair of pulleys, one mounted near each of the ends of said structure, an endless drive chain extending over said pair of pulleys, guide means for forming a guide track, said guide means extending along the length of said structure generally from one end to the other end thereof, spray gun carrying means for supporting a spray gun and associated equipment, said spray gun carrying means being mounted on said guide means for movement back and forth along said structure above the glass ribbon on the conveyor, spray gun and associated equipment means for applying a spray of material to the glass ribbon on the conveyor, said spray gun and its associated equipment means mounted on said spray gun carrying means for movement along said structure, pin and slot lost motion connection means for interconnecting said spray gun carrying means and an interconnecting portion of said endless drive chain in a manner that said endless drive chain moves said spray gun carrying means from one side to the other while said interconnecting portion of said endless drive chain is moving from one of said pulleys to the other and that the direction of movement of said spray gun carrying means is reversed when said interconnecting portion of said endless drive chain moves around a pulley, said spray gun carrying means being so mounted on their associated guide means and interconnected with their associated endless drive chain that said spray gun carrying means on said upstream support structure and said spray gun carrying means on said downstream support structure move in opposite directions past one another at the center of the upstream and downstream support structures and are reversed in direction at the same time;

motor means for supplying a rotational input;

a gear reduction drive;

an input shaft interconnecting said motor means and said gear reduction device;

output shafts interconnecting said gear reduction device and pulleys located at the same end of said upstream and said downstream support structures; and a flywheel connected to said input shaft for storing energy while said endless drive chains are moving their associated spray gun carrying means between pulleys and for supplying additional input to said gear reduction device and output shafts associated therewith to accelerate said spray gun carrying means to an operating speed after reversal of direction of movement thereof.

* * * * *